United States Patent [19]

Bellasalma et al.

[11] Patent Number: 4,959,401

[45] Date of Patent: Sep. 25, 1990

[54] SYNTHETIC ROCK COMPOSITION OF MATTER AND METHOD OF PREPARATION

[76] Inventors: Jay G. Bellasalma, 3620 Calmbrook La., Diamond Bar, Calif. 91765; Kenneth W. Lundrigan, 16337 Summershade Dr., La Mirada, Calif. 90638

[21] Appl. No.: 443,025

[22] Filed: Nov. 30, 1989

Related U.S. Application Data

[63] Continuation of Ser. No. 80,962, Aug. 3, 1987, abandoned.

[51] Int. Cl.$^5$ .................................................. C08K 3/00
[52] U.S. Cl. ................................... 523/466; 523/521; 523/455; 523/511; 524/297; 524/442; 524/444; 524/447
[58] Field of Search ....................... 523/171, 466, 521; 524/442, 444, 447, 297

[56] References Cited

U.S. PATENT DOCUMENTS

| | | |
|---|---|---|
| 4,049,634 | 9/1977 | Ko et al. .................................. 525/61 |
| 4,085,246 | 4/1978 | Buser et al. . |
| 4,159,301 | 6/1979 | Buser et al. . |
| 4,433,070 | 2/1984 | Ross et al. . |
| 4,544,584 | 10/1985 | Ross et al. . |
| 4,678,819 | 7/1987 | Sasaki et al. ........................... 428/15 |
| 4,752,229 | 6/1988 | Clingerman et al. .................. 428/15 |

OTHER PUBLICATIONS

Munoz et al., Reinforced Plastic Product, 12 Mar. 1982, PCT/US83/00335.

*Primary Examiner*—Lewis T. Jacobs
*Attorney, Agent, or Firm*—Poms, Smith, Lande & Rose

[57] ABSTRACT

Synthetic granite and/or marble is made from organic polymer based syrup and inorganic based paticulate. The particulate is made from naturally occurring minerals, baked to cause fusion of ingredients, crushed and placed into the organic syrup. Suitable catalyst is added. After cure the product has a granite or mable appearance and may be further processed as would naturally occurring granite or marble, or as would other commercially available rock be processed.

11 Claims, No Drawings

SYNTHETIC ROCK COMPOSITION OF MATTER AND METHOD OF PREPARATION

This is a continuation of copending application(s) Ser. No. 07/080,962 filed on Aug. 3, 1987, now abandoned.

BACKGROUND OF THE INVENTION

This invention relates to a man-made rock, preferably having the appearance of granite, and according to a variation in formulation, of marble. The synthetic rock of the present invention has many significantly better physical properties than natural granite and marble in relation to their commercial uses, and also has many significantly better physical properties in comparison to other known man-made rock compositions.

From a commercial viewpoint, an important feature relating to the synthetic rock of the present invention is its significantly lower bulk density, or specific gravity, in relation to natural rock, especially granite and marble. Much of the granite and marble used commercially is for exterior and interior panels for high rise buildings. In the design of these buildings, a tremendous amount of steel is used to provide strength sufficient to accept the added weight of the granite or marble. A decrease in steel reinforcement as well as associated labor savings is an expected result of use of the synthetic rock of the present invention in building construction. Preferred compositions of the present invention are synthetic granite and marble for use as exterior or interior panels in building construction.

In addition to its relatively great weight, natural stone is easily broken and usually has a relatively high breakage rate associated with either its transport or its installation. Breakage rates of natural granite are known to be as high as 70%. Synthesized granite of the present invention, on the other hand, because it is directly formed into solid sheets from a liquid mixture of organic polymer and inorganic particulate does not have inherent stresses which are normally found in natural granite. Another reason for high breakage in natural granite is its extreme brittleness. In the case of synthetic granite of the present invention, important physical properties, especially impact resistance and stain resistance, are much better.

Another major drawback of natural stone, especially granite, is its non-uniformity of particulate size, type and color. Because naturally occurring granite formations are not uniform, no two sheets of commercially available natural granite are the same in particle size, type or color. Because the stone of the present invention is man-made, particle size, type and color can be controlled for desired end properties as well as for repeatability.

Use of natural granite has established a sizeable industry. In the area of man-made stone having a granite appearance, the only product known to have received any commercial acceptance is a material sold under the name Avonite. However, the area of acceptance is limited to interior counter tops because that material has extremely poor weather resistance, especially to ultraviolet rays. The Avonite synthetic granite composition is believed to be formed by introducing a hardened polymer into a liquid polymer.

In comparison to the synthetic rock compositions of the present invention commercially available Avonite compositions are soft and unstable, especially in exterior environments or when exposed to ultraviolet light. Also the Avonite compositions have low heat distortion, beginning at about 130° F., poor impact resistance; poor abrasion resistance and high thermal expansion in comparison to compositions of the present invention.

Below are listed various physical properties of a granite composition of the present invention compared to a sample of the Avonite composition:

| ASTM No. | Properties | A Sample of the Present Invention | A Sample of the Avonite Composition |
| --- | --- | --- | --- |
| — | Barcol Impressor (Hardness) | 90 (particulate) | 40 (particulate) |
| D-648 | Heat Distortion | 272 | 130 |
| E84-70 | Surface Burning | Class 1 | Failed both 1 & 2 |

In addition to the Avonite composition, another known synthetic rock composition is made by crushing and sieving naturally occurring marble, and then introducing it into a two component epoxy polymer for production of a cast block material. The blocks are then cut into sheet form. This material is believed to have been developed by Armstrong World Industries.

OBJECTS OF THE INVENTION

One of the objects of the invention is a composition of matter which has the appearance of granite.

Another object of the invention is a method of making a synthetic stone composition.

Another object of the invention is a synthetic rock composition having good chemical resistance, good resistance to ultra violet light degradation, and improved strength.

Another object of the invention is an inorganic particulate for use in synthetic rock composition.

Another object of the invention is a solution of inorganic materials which can be made into in an inorganic particulate portion of a synthetic rock.

Another object of the invention is a liquid polymerizable organic syrup which upon copolymerization is hard, clear to opaque, fire retardant, ultra violet light and chemical resistant and suitable as either a coating or as a base material for synthetic rock compositions.

Another object of the invention is a liquid impervious inorganic particulate formed at least in part by fusing a relatively small amount of metal with inorganic filler material.

Another object of the invention is a synthetic rock having the appearance of granite or marble that could be cut, fabricated and polished into a wide variety of shapes.

BRIEF DESCRIPTION OF THE INVENTION

The man-made rock of the present invention is made from an organic side, also called an organic syrup and an inorganic side, also called a particulate. The organic side contains a binder which is a polymer liquid, preferably a fire retardant vinyl ester. The inorganic side contains a variety of naturally occurring minerals, water and reducer, pigment, and, optionally, a small amount of metal or metal oxide.

The organic side binder must be suitable for casting, resin transfer molding or injecting. Other ingredients may be included with the syrup, such as for example Di-octyl-phalate with polyester based syrups to increase impact resistance and Niacole and Antimony Oxide to increase fire retardancy. The Antimony Oxide not only improves the fire retardancy but also acts as an ultraviolet inhibitor and is included in preferred formulations. Hinder amines in small quantities may also be used to stablize ultraviolet degradation. The percentage weight of individual raw materials, based on total syrup weight, to yield acceptable vinyl ester base formulations are as follows:

| Ingredient | Weight % Range |
| --- | --- |
| Vinyl Ester binder | 55–60% |
| Styrene Monomer | 35–40% |
| Di-octyl-Phalate, when used | .5–10% |
| Antimony Oxide, when used | 0–5% |
| Hindered Amine, when used | .15–.5% |
| Niacole, when used | .0–5% |
| Miscellaneous Promoters and Co-promoters (Co-promoter when used) | .1–.3% |
| Miscellaneous Inhibitors | .01–.3% |

The organic syrup ingredients are mixed in a suitable container in a conventional manner.

The inorganic side must be a particulate and contain particles which can be mixed with an organic syrup to yield, after polymerization, a suitable product. It is the particulate that causes the granite, marble or stone look in the preferred formulations of the present invention. By changing the size and color of the particulate in specific formulations virtually any of the commercially sold granites and marbles can be reproduced, and naturally occurring granites and marbles can be approximated in appearance. The main raw material components of preferred particulate formulations include: feldspar, which consists of Aluminum Silicates, Potassium and or Calcium; kaolin, which is a high temperature, high absorbent filler; silicon dioxide which is used as a high temperature melting binder and which also provides clarity in the finished product, according to its weight % in the formulation; optionally, small amounts of metals or metal oxides to provide a binding and water sealing function; reducer and water; and a high temperature inorganic sythetic oxide pigment which provides a variety of different colors for different grades and types of granite and marble. The various percentages of the inorganic raw materials which will yield good particulate compositions are as follows:

| Ingredient | Weight % Range |
| --- | --- |
| Feldspar | 0–100% |
| Kaolin | 0–90% |
| Silicon Dioxide and/or Tridymite | 0–100% |
| Oxide Pigment | .1–12% |
| Reducer and Water | 5–60% |

The inorganic ingredients are mixed using a high shear dispersion blade; poured into molds and cured at a low temperature of about 200° F. for several hours; then removed from the molds and slowly elevated to a temperature of about 1600° F. to 3000° F. over a period of 1 to 8 hours depending on thickness; held at the peak temperature for a very short time i.e., 1–60 minutes and then permitted to return to ambient temperature, to form a hardened slab which is then crushed and sieved with conventional means to yield a particulate. The particulate is then divided into different mesh sizes for subsequent introduction into the organic syrup.

Silicon dioxide and/or tridymite may be mixed with very small amounts of the other ingredients to form products having a high degree of clarity, due to silicon dioxide's semitransparency after cure. Synthetic rock made with high silicon dioxide loading has the appearance of significantly increased depth and vitality in comparison to other formulations.

There are several reasons why the product of the present invention is considered to be superior to previously known natural or synthetic rock used in commercial applications. The synthetic rock of the present invention has excellent resistance to chemical attack, ultraviolet light, abrasion and impact. Also, in comparison to known Avonite compositions, compositions made in accordance with the present invention have high resistance to thermal expansion and are resistant to heat distortions at temperatures in excess of 400° F. The compositions of the present invention are also sufficiently resistant to chemical attack that they may be used in exterior environments, including those susceptible to acid rain. Additional benefits of the present invention compared to known commercial rock materials include a virtually infinite number of color combinations for cosmetic appearance; the ability to mold, inject or cast into detailed shapes, for example wash basins, tubs, and spas; and the fact that the synthetic rock of this invention is essentially non-porous, which property results in high resistance to stains. In this regard natural grantite yields poor results on the standard iodine test because pores are usually found throughout the natural matrix, some of which may be seen by the naked eye.

The area of greatest expected use for the preferred compositions of the present invention are in fabrication of exterior building panels and interior flooring as well as for other vertical and horizontal surfacing materials.

DETAILED DESCRIPTION OF THE INVENTION

A detailed description of the present invention follows, with reference to suitable starting materials, methods of preparation and examples of various specific formulations.

Organic Side Syrup-Ingredients and Preparation

The organic side syrup, which may also be called the syrup, the liquid polymer side, the organic side or the liquid filler matrix includes an inorganic base, also known as a binder; in unsaturated polymer formulations, monomer, which also is commonly known as styrene monomer; optionally a plasticizer; optionally an ultra violet light inhibitor, also commonly called a u.v. inhibitor; optionally, fire retardant; and miscellaneous promotors, optionally co-promoters and inhibitors depending upon the choice of the organic binder.

The proportions of the various ingredients in the liquid polymer side are listed, by weight % of the total liquid polymer, as follows:

| Ingredient | Weight % Range |
| --- | --- |
| Organic Base, or Binder | 5–95% |
| Monomer, when used | 35–95% |
| Plasticizer, when used | .5–10% |
| U.V. Inhibitor, when used | .15–.5% |
| Fire Retardant, when used | .5–5% |
| Promoters, Co-promoters, when used | .1–.3% |
| Inhibitors, when used | .01–.3% |

Liquid polymer side ingredients are weighed or measured within and in accordance with the weight % ranges set forth above and then mixed in a suitable container with conventional equipment. The ingredients are mixed in a conventional manner to a uniform dispersion and may be placed in an appropriate vessel to await mixing, preferably with the inorganic side particulate disclosed herein. The viscosity of the liquid polymer must be greater than about 1800 c.p.s., thus giving the organic side the characteristic appearance of a thick syrup as it is poured.

Although the syrup disclosed herein is preferably used with the particulate of the present inventions, it may also be used in conjunction with other materials such as crushed natural stone, hardened polymer particulate, or any other inert filler material. Also, the syrup may be used, with appropriate catalyst, as a coating for numerous materials such as wood, stone, or any other inert material or surface.

A wide range of specific chemicals for each of the liquid polymer side ingredients listed above will produce a good liquid filler matrix. Specific ingredients and classes of such ingredients are as follows:

Binders

Suitable binders, or organic bases include broad classes of polymers such as unsaturated polyesters, epoxies, acrylic polymer and phenolic resins.

One class includes the reaction product from of a condensation reaction of an unsaturated polybasic acid and a polyhydric compound. Such reaction products are commonly known as unsaturated polyesters, such as di-cyclo polyester ("DCP") and vinyl ester each of which are preferred binders of this invention, as well as orthophthalic polyesters ("ortho"), isophthalic polyesters ("iso"). Unsaturated polyester binders which have been used in preferred formulations of the present invention have had an average refractive index of at least 1.76.

The methods of preparation of this class of polymers are well known, and the starting materials are readily available commercially. For example, the reaction product of condensation of a di-hydric or tri-hydric compound such as glycol with an alpha-beta ethylenic compound to yield the unsaturated dibasic acid is well known and yields a suitable binder within the scope of the present invention.

Specific unsaturated dibasic acids within the scope of the present invention include malic, fumaric, citaconic chloromaleic acids, allylsuccinic, itaconic mesaconic acids and other acids of this type known to those skilled in this art. The anhydrides of these acids are also specifically included within the scope of the invention.

Other polybasic, unsaturated acids within the scope of the present invention include dibasic acids such as phthalic acids; ortho-, iso- and terephthalic acids; and adipic, succinic and sebacic acids as well as numerous other similar acids well known to those of skill in this art.

Saturated, or unsaturated polyalcohols suitable for use in this invention include ethylene glycol; diethylene- and tri-ethylene-glycol, propylene- and dipropylene-glycol; neopentyl glycol and similar polyalcohols known to those of skill in this art. Also, as is well known, a saturated polybasic acid or anhydride, such as a dibasic acid may be used with the unsaturated acid or anhydride to moderate its reactivity.

Another class of binder includes a wide variety of commonly available epoxies, specifically including those which have suitable color characteristics. Epoxies which have been found to be useful in this invention are the thermoset type. As is known, when epoxies are used as thermosetting materials, generally a co-reactant is used to achieve crosslinking. In room temperature curing systems, the co-reactant which serves as the crosslinker is usually an amine such as diethylenetriamine or triethylenetetramine. When an elevated temperature curing system is possible, a number of different curing agents can be used. These include aromatic amines, anhydrides, carboxylic acids, phenol novalacs, and amino resins such as substituted melamines and urea formaldehyde.

The preferred epoxy resin for use in this invention is bisphenol-A and epichlorohydrin (DGEBA), sometimes modified with butyl glycidyl ether. Other specific types of epoxies which are suitable for use in this invention, including aliphatic epoxy, and multi-functional epoxy.

In formulations within the scope of the present invention using an epoxy binder, the epoxy may be blended with conventional solutions used for controlling viscosity and needed for a variety of other process requirements. For example, the epoxy may be mixed with toluene, butanol, ethylene glycol, monoethyl of ethylene, xylene, methyl ethyl ketones, methyl isobutyl ketones and many other solvents commonly used with epoxy resins.

Numerous acrylic polymers are also suitable for use as the organic binder of the present invention. Such polymers include alkyl acrylates, alkyl methacrylates as well as their copolymers and homopolymers. The preferred acrylic polymer is methyl methacrylate.

Also, phenolic resins and related mixed compounds may be used as the organic binder because they have excellent qualities including high heat resistance, high compressive strength, low weight, superior chemical and moisture resistance, and low thermal expansion.

Phenolics are produced by reacting phenol with formaldehyde. Single stage phenolic resins which are referred to as resols are produced with an alkaline catalyst together with all the formaldehyde necessary to complete the reaction with phenol. Two stage phenolic resins which are referred to as novolacs are produced when the reaction is controlled between phenol and formaldehyde in the presence of an acid catalyst, with only part of the necessary formaldehyde is introduced into the reaction. To complete crosslinking, hemamethylenetetramine ("hexa") is added to serve as a catalyst in phenolic crosslinking reactions. When heated, the hexa breaks down into ammonia and formaldehyde and forms crosslinking bridges of carbon between resin molecules to form a thermoset product.

Experiments using presently available phenolic resins as the organic binder yielded excellent results from the physical properties perspective. The synthetic granite specimens produced with phenolic as binder, however, are limited in color variety with presently available phenolics, all specimens being in the darker region of the color spectrum.

All of the above listed binders are suitable because they will yield a product having good physical bond quality. As noted, however, the presently available phenolics limit the final product color choices to the darker colors of the spectrum. These binders are also readily available and are practical to use. Synthetic rock compositions made using these binders also possess good characteristics for common fabrication techniques such as grinding, cutting, polishing and bonding to other materials to produce finished products.

Monomer

In formulations where the organic base or binder is an unsaturated polyester, the organic base is dissolved in a monomer, as that term is commonly used in this art, i.e., the monomer has an unsaturated double bond which is copolymerizable with the unsaturated alpha, beta double bonds of the polyester. The term monomer as used here refers to aromatic hydrocarbons also commonly known and available as styrene monomer, styrene, vinylbenzene, phenylethylene, cinnamene 12, and ethenyl-benzene.

Unsaturated monomers which are copolymerizable with unsaturated polyester resins include vinyl benzene, vinyl toluene, methyl methacrylic t-butyl styrene, styrene and others well known in this art.

The monomer also is used to reduce viscosity of the binder. Dilution is usually needed so that the material can be more easily handled, especially when casting, molding or injecting is employed as is well known in the art.

Monomer is not used in epoxy base formulations.

When acrylic polymers are used as the binder then an acrylic monomer, such as methyl acrylate; ethyl acrylate and methacrylate; n-propyl and isopropyl acrylates; methacryla-, n-butyl-, 2-butyl-, i-butyl- and t-butyl acrylates and others commonly known and available. The preferred acrylic monomer is methyl methacrylate.

When phenolics are used as a binder, no monomer is used.

Plasticizer

Plasticizer may be added to give the polymer flexibility and impact resistance for those formulations in which an unsaturated polyester is used as the binder. Numerous commonly known and available plasticizers are suitable for polyester binders and include a broad range of polymeric and monomeric plasticizers such as Di-octyl-phthalate, Di-isononyl-phthalate, Di-isodecyl-phthalate, Di-N-butyl-phthalate and others. The preferred plasticizer is di-octyl-phthalate, also known as di(2-ethylhexyl), as used in the vinyl ester example in this specification.

U V. Inhibitor

There are a number of u.v. inhibitors which may be included in the organic side. They are currently commercially available from Western Federal Chemical Corp., Downey, CA; Eastman Chemical Kingsport, TN.; BASF Wyandotte Corp., Parisippany N.J.; and Ciba-Geigy Corp, Hawthorne, N.Y. The preferred u.v. inhibitor is the hindered amine 2-(2'-hydroxy-3', 5'-di-tert-amylphenyl) Benzotriazo, sold under the tradename tinuvin 328 by Ciba-Geigy Corp. and sold by Western Federal Chemical Corp., Downey, CA, as WFUV-12200.

Fire Retardant

Ingredients which may be included with the formulation to assist polyesters in retarding fire are tetrabromo and tetrachloro phthalic anhydride; dibromotetra hydrophthalic anhydride; chlorendic acid; tetrabromobisphenol A; and dibromo neopentyl glycol. Additionally, commercially available compounds sold under the name Niacole and Antimony can be added to further improve fire retardancy.

Initiator Systems, Promotors, Co-promoters and Inhibitors

For unsaturated polyester based organic syrups, primary promoters, also known as accelerators, include cobalt salts in the proportion of 0.001 to 0.008 based on the weight of the total organic binder/monomer mix are used.

Inhibitors are added to polyester based organic syrups, for reasons well known to those of skill in the art and include hydroquinone; p-benzoquinone; mono-t-butylhydroquinone and others well known in the art. Hydroquinone is the preferred inhibitor and is used at concentrations of 12-50 ppm in conjunction with MEKP catalyst, as described later. If in excess of 50 ppm, gel times in the reaction with low reactivity polyesters would be adversely affected. At concentrations of less than 50 ppm, the hydroquinone is still able to moderate the effect of the MEKP catalyst. Also, the presence of hydroquinone in concentrations within this range reduces the peak heat, or exotherm temperature of the reaction. The preferred hydroquinone concentration is about 12 ppm for formulations where the organic binder is polyester.

Secondary promoters for polyester based syrups, also known as secondary accelerators are optional; and preferred secondary promoters include copper or manganese salts of 0.0001 to 0.001 parts by weight based on the weight to the total binder/monomer mix weight. Potassium octuate may also be used as a secondary promoter in quantities of 0.0001 to 0.002.

Other accelerators for polyester based syrups may be aromatic tertiary amines, as is known in this art.

For acrylic based organic syrups, initiator systems include about 0.1-5% by weight, based on binder weight, a conventional free radical initiator. Peroxy or azo compounds are preferred. Benzyl peroxide, lauroyl peroxide, hydrogen peroxide, t-butyl perbenzoate, t-butyl peroxypivalate, t-butyl peroxymaleic acid, and others familiar with the art may also be used.

Many cure systems, each with known advantages and disadvantages, can be used with acrylic polymers as the binder. A preferred system, because of its practicality, is disclosed in U.S. Pat. No. 3,775,364. That system involves a polymerizable constituent, a peroxy compound and water. Water is used as a promoter for the peroxy compounds.

When epoxy based syrups are used, co-reactants as described above serve the same purpose as do promoters and inhibitors for polyester based syrups. When phenolics are used, the hexa serves this purpose.

Inorganic Side Particulate - Ingredients and Preparation

The inorganic side, also known as the particulate, includes a first inorganic binder, usually a second inorganic binder, usually a filler, optionally a metal or metal oxide, reducer and water, and oxide pigment.

The proportions of the various ingredients in the inorganic side particulate formulations which yield acceptable results are listed as follows:

| Ingredient | Weight % Range |
|---|---|
| First Inorganic Binder | 0-100% of the total solid |
| Filler | 0-90% of the total solid |
| Second Inorganic Binder, | trace-100% of the total solid |
| Metal or Metal Oxide, | .1-20% of the total solid |

-continued

| Ingredient | Weight % Range |
| --- | --- |
| when used | |
| Oxide Pigment | .1–12% of the total solid |
| Reducer and Water | 5–60% of the total solid and liquid |

Although the inorganic particulate of the present invention is preferably used in conjunction with the organic syrup also disclosed herein, the particulate may be used with a liquid filler matrix of other formulations besides those disclosed herein to yield acceptable products.

First Inorganic Binder

The first inorganic binder is feldspar or its equivalent. The feldspar performs a fusion or binding function when the inorganic side is heated, melted and cooled. The feldspar loading and specimen thickness influences the temperature at which the oven is set and the length of time the ingredients are left in the oven during preparation of the particulate. In heating, it is important that the feldspar melts, but only for a short time. During the heating step, in preparation of the particulate, a narrow range of temperatures of about 100° F. exists for a given formulation and which will required to enable the feldspar to melt and fuse the other ingredients without itself flowing to the bottom of the mix or otherwise not providing proper fusing of the other ingredients.

Filler

The filler material is kaolin or its equivalent especially when the first binder is feldspar. Filler material is chosen and used to improve the physical characteristics of the inorganic side when the first binder is feldspar, inasmuch as feldspar does not have good physical characteristics and in high proportions in the formulation, would result in poor quality final product.

Second Inorganic Binder

The second organic binder is $SiO_2$ or its equivalent, such as tridymite. Silicon dioxide is the preferred second inorganic binder because it has an ideal melting range, ideal hardness and also yields a high degree of clarity in the finished particulate. When a final product having high clarity, as compared to an opaque final product, is desired, greater amounts of $SiO_2$ are used in proportion to other ingredients in the inorganic side.

Metal

Preferred metals used in the present invention are Iron, Cobalt, Chromium, Aluminum, Zinc, Titanium, Nickel, Tin, Magnesium, Manganese and their oxides. Mixtures of the above may also be used.

Addition of these metals can significantly improve cutting and drilling properties of the finished product. For example, Aluminum, Zinc and Iron yield excellent products in this regard.

During heating, the metals melt, fuse with the other ingredients and, of great importance in the present invention, seal the particulate to water penetration. When feldspar, even with kaolin, is used as the binder, the fused particulate would still be susceptible to water penetration in the absence of such metal used as an ingredient. The metal is also useful in that upon melting and solidifying it acts as a binder and enhances the binding characteristics of the particulate. Variations in the type and amount of metal cause variations in the hardness, in the appearance of the final product, and in the ability to cut, drill or polish the finished product.

Oxide Pigment

Oxide pigments are commercially available and the preferred oxide pigments are commonly known as reacted oxides of Cobalt, Chromium, Ion, Aluminum, Zinc, Titanium, Nickel, Manganese and Antimony. These reacted oxides are preferred because of their good, high temperature stability. Various oxide pigments may be blended with the resulting blend used in the inorganic side to yield a wide range of colors.

Reducer and Water

Reducers suitable for this invention include a variety of Ketones and petroleum base products. The reducer controls flash off of the liquids, and thus controls weight loss. If the weight loss is too rapid the product will develop cracks and be unsuitable for processing. The reducer usually does not exceed 20% of the weight of the liquid side of the inorganic ingredient mix, with a preferred amount being about 10%. The 10% is based only on liquid side of the inorganic mix. Water is a main ingredient in the liquid side, and accounts for up to 95% by weight of the inorganic liquid ingredient mix. Water suspends and holds all of the inorganic ingredients such as the silicone dioxide, feldspar, kaolin, and the metal or metals.

The inorganic side ingredients are mixed to a desired degree of uniformity using a low RPM Hobart or ribbon-type blender, or other suitable mixing techniques to be sure not to damage the particulate and then poured into molds and cured at low temperature, about 200° F., for several hours to dry. The term dry in this context means to flash off or evaporate all controlling reducers and of water. The material, which at this point is semi-hard, is then removed from the molds and is slowly elevated to a temperature of 1800° F. to 3000° F., depending on the type and proportions of ingredients in the mix. The increase in temperature should take place from about 1 hour to 8 hours depending on specimen thickness. After reaching the elevated temperature, the inorganic filler is cured from 0 to about 60 minutes depending on thickness. For example a $\frac{3}{8}''$ thick specimen will require a relatively long time of about 40 minutes, but a thin speciman will require a relatively short time of about 5 minutes or less.

Following this cure the inorganic side material is slowly cooled to ambient temperature to yield a hardened slab. The slab is then crushed and sieved by conventional means. The particulate is then separated according to mesh size and color, for later introduction into the organic side syrup. The particulate of the present invention typically has a Barcol Hardness of about 90.

Preparation of the Synthetic Rock Composition From the Organic Side Syrup and the Inorganic Side Particulate.

With the organic side syrup and the inorganic side particulate prepared as described above, formulation of the synthetic rock of the present invention will now be described in the context of a laboratory scale process. Scaling the process to commercial quantity production is well within the skill of those knowledgeable in the art and will not be specifically described.

In the formulation of the synthetic rock from the organic and inorganic side materials, the two sides may be used in a range of ratios of from about 1:5 to about 1:1, with a preferred ratio of about 1:3.5 by weight.

First, a quantity of syrup is measured and placed into a beaker or other suitable container. Next a deareation compound, as described in the examples, is measured and added in an amount of from 0.001 to 0.012 by weight of the syrup. The syrup is then mixed in a low speed dispersion mixer, at about 1000 RPM for several minutes. The syrup is then evacuated to 29-30 inches Hg in a vacuum chamber for 5-10 minutes at 20° C. to 30° C., with 25° C. preferred. Lower or higher temperatures may be used so long as it is accounted for in the formulations. Variations in temperature above or below this range will adversely affect the viscosity and reaction of the mixture.

Next the syrup is removed from the vacuum chamber, and individual particulate quantities, which may vary in mesh size, color and composition are weighed and added, in any order, to the syrup to form a mixture of syrup and particulate. The mixture is then mixed slowly with a Hobart mixer at about 10-60 RPM or with a ribbon-type blender to uniform particulate dispersion as desired.

The mixture is then subjected to a vacuum deareation period where it is placed on a vibration table and/or positioned for slow mixing with a Hobart mixer or ribon-type mixer and evacuated. The mixture is vibrated and/or mixed at a rate selected so that the lower material is moved from the bottom to the top of the container without adversely slowing down the rate of deareation in the vacuum chamber. Vibration table rates in the order of 5000 VPM, and/or mixer speeds of about 10 RPM for a 3-5 minute period provide sufficient deareation. Alternatively, a long vacuum chamber time may be used in this stage of the process.

Next, and preferably while the mixture is still in the vacuum chamber, the catalyst is added. Catalysts used for unsaturated polyesters are divided into catagories in relation to whether the mixture will be room cured or oven cured or a combination of the two. The individual catalysts are well known to those familiar with the art. The preferred catalyst for polyester type organic side formulations is an organic peroxide, specifically methyl ethyl ketone peroxide (MEKP) having an active oxygen level of 11% and in an aqueous solution of less than 9%. Other well known catalysts for room cured polyester based syrup may be used, including DDM-9, sold by Lucidol. The functional equivalents for acrylic and phenolic based syrups have previously been described.

A vacuum of 29-30 inches Hg is then re-established, or maintained, and vibration and/or mixing is reestablished or maintained until deareation is complete, but in no event longer than about five minutes, because with addition of catalyst the mixture has a pot life of only about 15 minutes.

Next vacuum is broken and the organic plus inorganic mixture is put into a mold suitable for good autogenic cure. If the mold is thermally conductive a bath or other heat source is preferred in order to establish and maintain good autogenic cure conditions.

Also, optionally, but preferred, an additional vacuum and vibration treatment of the mold for a period not to exceed gelation time may be employed.

The formulations of the present invention typically have a gel time of about 15 minutes, thus allowing approximately 10 minutes to place the mixture into the mold after vacuum is broken.

The mixture in the mold is allowed to cure for at least one hour and the material is then removed from the mold.

After removal the material has the appearance and properties of rock, or stone and may then be cut, ground, attached to backing materials, and so forth, as would naturally occurring rock be processed for commercial use.

The synthetic rock of the above described formulations typically has the appearance of granite. The synthetic rock may be used in the same way as natural rock, or granite is used, such as being cut into slabs for interior or exterior building panels, countertops, and tiles. It may also be formed into accessory items such as statues, bookends, penholders, desk tops etc.

The back of the synthetic granite product can be sprayed with a polyester-fiber-glass composition giving the product added strength and rigidity. The reinforcement using a polyester and fiberglass roving is a process commonly referred to as fiberglassing.

Slabs of the synthetic rock may also be adhered to various materials with the same techniques and adhesion agents as natural granite or other known synthetic rock compositions. The synthetic rock of the present invention may also be drilled and milled with great ease in comparison to drilling and milling natural granite.

Although there are variations depending on specific formulations, the Barcol Hardness of synthetic rock of the present invention averages about 70-75.

Preparation of Synthetic Marble

With reference to the above-described organic syrup and inorganic particulate, a synthetic marble may be prepared by modifying the process of mixing the inorganic side with the organic side.

Specifically, the same processing steps previously described are used except that several quantities of different colors of inorganic particulate are prepared. The number of different colors are prepared as desired.

During the 10 minute gel period remaining after deareation, various quantities of different colored particulate are placed in layers in the partially syrup filled container, with the number of layers and thickness of each layer as desired, until the container is filled. Then, with a blunt mixing instrument, the layered mixture is further mixed by slow rotation and/or by slow backward movement of the instrument to achieve a desired, less than uniform mixture of the particulate.

The mixture is then randomly poured into the mold and is allowed to cure. The resulting synthetic rock product has a marble-like layered appearance. When formulating synthetic marble, caution must be taken to make the syrup thick enough so that the individual colors of particulate do not intermix without the aid of the mixing instrument. A syrup which is too thin will preclude formulation of a marbled appearance in the final product.

Following is a series of examples showing specific formulations of the synthetic rock compositions of the present invention together with the specific listing of ingredients.

| Listing of Inorganic Compounds used in the Experimental Particulates: |
|---|
| Silicon Dioxide #600P |

-continued
Listing of Inorganic Compounds used in the Experimental Particulates:

Silicon Dioxide #200B
Silicon Dioxide #1100R
Red Particulate #150
Red Particulate #180
Pink Particulate #800
White Particulate #300
Black Particulate #500
Brown Particulate #500
Brown Particulate #250
Beige Particulate #275

Listing of Iron Oxide Pigments

Iron Oxide 110m and Iron Oxide 180m are both available from Mobay Chemicals, Pittsburgh, PA.

Individual Particulate Formulations

In the following six examples various particulate formulations are referred to by number. The specific formulations of each particulate is listed below as follows:

Silicon Dioxide #200B
| | |
|---|---|
| Silicon Dioxide | 1000 grams |
| Titanium Oxide | 10 grams |
| Brown Oxide Pigment | 10 grams |
| Water | 250 grams |
| Peak temperature | 2620° F. |

Silicon Dioxide #1100R
| | |
|---|---|
| Silicon Dioxide | 1000 grams |
| Aluminum Grinding 325 mesh, 45 microns in shortest length | 20 grams |
| Water | 250 grams |
| Peak temperature | 2620° F. |

Silicon Dioxide #600P
| | |
|---|---|
| Silicon Dioxide (industrial grade mesh 325) | 1000 grams |
| Titanium Oxide (automotive finish grade) | 5 grams |
| Synthetic Iron Oxide | 3 grams |
| Water | 250 grams |
| Peak temperature | 2620° F. |
| Five minutes at peak temperature. | |

Note: When time at peak temperature is not critical it is not mentioned

Red Particulate #180
| | |
|---|---|
| Feldspar | 500 grams |
| Kaolin | 300 grams |
| Nickel | 50 grams |
| Iron Oxide 180 m | 42 grams |
| Reducer Mineral Spirits | 64 grams |
| Water | 200 grams |
| Peak cure temperature | 2230° F. |

Red Particulate #150
| | |
|---|---|
| Feldspar | 500 grams |
| Kaolin | 300 grams |
| Nickel | 50 grams |
| Iron Oxide 180 m | 21 grams |
| 110 m | 21 grams |
| Reducer Mineral Spirits | 64 grams |
| Water | 200 grams |
| Peak cure temperature | 2230° F. |

Pink Particulate #800
| | |
|---|---|
| Feldspar | 300 grams |
| Kaolin | 500 grams |
| Aluminum | 80 grams |
| Iron Oxide 180 m | 42 grams |
| Mineral Spirits | 64 grams |
| Water | 200 grams |
| Peak Cure Temperature | 2190° F. |

White Particulate #300
| | |
|---|---|
| Feldspar | 600 grams |
| Kaolin | 200 grams |
| Titanium Oxide (automotive finish grade) | 80 grams |
| Iso-propyl Alcohol | 64 grams |
| Water | 225 grams |
| Peak Cure temperature | 2190° F. |

Black Particulate #500
| | |
|---|---|
| Feldspar | 600 grams |
| Kaolin | 200 grams |
| Black Oxide Pigment | 120 grams |
| Mineral Spirits | 64 grams |
| Water | 225 grams |
| Peak Temperature | 2190° F. |

Brown Particulate #250
| | |
|---|---|
| Silicone Dioxide | 600 grams |
| Kaolin | 200 grams |
| Brown Oxide Pigment | 55 grams |
| Iron Oxide (grindings 325 mesh) | 55 grams |
| Mineral Spirits | 64 grams |
| Water | 225 grams |
| Peak Cure Temperature | 2800° F. |

Beige Particulate #275
| | |
|---|---|
| Silicone Dioxide | 600 grams |
| Kaolin | 200 grams |
| Brown Oxide Pigment | 55 grams |
| Titanium Oxide | 55 grams |
| Mineral Spirits | 64 grams |
| Water | 225 grams |
| Peak Cure Temperature | 2600° F. |

Example 1

Unsaturated Polyester Vinyl Ester Sirup

Curing Agent=Catalyst=MEKP-9, 2% by weight based on vinyl ester syrup weight, and available from Norac Chemical, Asuza, California.

| | | |
|---|---|---|
| Vinyl ester base | 1000 | grams |
| Styrene Monomer | 680 | grams |
| Inhibitor Level | 12 | ppm |
| Cobalt Octuate 12% | 1.7 | grams |
| Tinuvin 328 | 4.25 | grams |
| Potassium Octuate 977 | 1.7 | grams |
| Fumed Silica added until desired viscosity of 1800 c.p.s. is reached | | |
| Total wt. excluding Fumed Silica wt. | 1,687.65 | grams |

Fumed Silica = Cabosil M-5 manufactured by Cabot Corp., Tuscola, Ill.
Potassium Octuate 977 = Potassium 977, Mooney Chem., Cleveland, OH.
Vinyl Ester base = 922 base, Ashland Chemical, Columbus, OH.
Styrene Monomer = Styrene Monomer 12, Ashland Chem., Columbus, OH.
Cobalt Octuate 12% = Ram Chemicals, Gardena, California

U.V. Stabilizer

Tinuvin 328=Ciba-Geigy Corp., Hawthorne, N.Y.

Example 2
Synthetic Granite Formulation
| | | |
|---|---|---|
| Vinyl Ester Syrup of Example 1 | 300 | grams |
| Semi-Transparent Particulate | | |
| Silicon Dioxide #200B Mesh 20 | 200 | grams |
| Silicon Dioxide #200B Mesh 12 | 200 | grams |
| Silicon Dioxide #200B Mesh 8 | 100 | grams |

Example 2
Synthetic Granite Formulation

| Opaque Particulate | |
|---|---|
| Brown Particulate #250 Mesh 20 | 220 grams |
| Brown Particulate #250 Mesh 12 | 160 grams |
| White Particulate #300 Mesh 20 | 90 grams |
| White Particulate #300 Mesh 12 | 10 grams |
| Beige Particulate #275 Mesh 20 | 30 grams |
| Beige Particulate #275 Mesh 12 | 10 grams |
| Black Particulate #500 Mesh 20 | 30 grams |
| Black Particulate #500 Mesh 12 | 10 grams |
| Deaeration Chemicals | |
| ByK-A-515 | .6 grams |
| ByK-A-501 | .9 grams |
| Total Wt. | 1,361.5 grams |

It may be necessary to add a small amount of vinyl sirup in addition to the 300 grams already added. Depending on particulate process techniques surface friction can vary from batch to batch. For formulations using other organic syrups, it may also, for the same reason, be necessary to add more syrup to achieve acceptable viscosity of the mixture. The variation can cause changes in viscosity and flow characteristics.

Mix thoroughly with low rpm Hobart or ribbon type blender.

Results: Medium Brown Quartz Granite.

Deaeration Chemicals

ByK-A-501 and ByK-A-515 may be obtained from ByK-Chemie U.S.A., Wallingford, Conn.

Example 3
Epoxy Syrup

| Epoxy Resin Bisphenol-A Base | 1000 grams |
|---|---|
| Hardner or Curing Agent, Polyamide | 1000 grams |
| Tinuvin 328 | 5 grams |

Epoxy Resin = Bisphenol-A-base modified with butyl-glycidylether Manufactured by Cargill Chemicals, Minneapolis, Mn., Product #1169.
Hardner or curing agent = Polyamide available from Ciba-Geigy, Hawthorne, N.Y.
Tinuvin 328 = U.V. Stabilizer available from Ciba-Geigy, Hawthorne, N.Y.

Because Epoxy Resin 1169 is a relatively slow curing system and the resin is in a 1:1 mix with the hardner, mixing can and must occur before being mixed with the particulate. If epoxy resin was introduced to the particulate without a hardner, the mix would be so high in viscosity the material would lose virtually all flow characteristics.

Example 4
Synthetic Granite With Epoxy Syrup

| Epoxy Resin Mixture | 300 grams |
|---|---|
| Silicon Dioxide #600P Mesh 12 | 200 grams |
| Silicon Dioxide #600P Mesh 20 | 100 grams |
| Silicon Dioxide #600P Mesh 8 | 50 grams |
| Red Particulate #150 Mesh 20 | 20 grams |
| Red Particulate #150 Mesh 8 | 10 grams |
| Pink Particulate #800 Mesh 20 | 550 grams |
| Pink Particulate #800 Mesh 8 | 135 grams |
| White Particulate #300 Mesh 20 | 15 grams |
| Black Particulate #500 Mesh 20 | 10 grams |
| ByK-A-515 | .6 grams |
| ByK-A-501 | .9 grams |

Mix thoroughly with a low RPM Hobart or Ribbon type blender.
Results: Light Pink Quartz-like Granite.

Example 5
Acrylic Based Syrup

| Methyl Methacrylate | 20 grams |
|---|---|
| Ethylene Dimethacrylate | 2 grams |
| Methyl Methacrylate Monomer | 278 grams |
| Opaque and Translucent Particulate | |
| Silicone Dioxide #1100R Mesh 12 | 220 grams |
| Silicone Dioxide #1100R Mesh 20 | 100 grams |
| Silicone Dioxide #1100R Mesh 8 | 50 grams |
| Red Particulate #180 Mesh 20 | 240 grams |
| Red Particulate #180 Mesh 8 | 140 grams |
| White Particulate #300 Mesh 20 | 40 grams |
| Opaque Particulate | |
| White Particulate #300 Mesh 8 | 10 grams |
| Black Particulate #500 Mesh 20 | 20 grams |
| Aluminum Glitter Microns = 100 in size | .20 grams |

Mix thoroughly with low RPM Hobart or ribbon type mixer.

| Catalyst System | |
|---|---|
| Luperox PMA-50 | 2.25 grams |
| Water | 1.10 grams |
| Ethlene Glycol Dimercaptoacetate | .50 grams |

Mix thoroughly same method as before.
Result: Burgundy Quartz Granite.

Example 6
DCP Syrup

| DCP High Reactive Resin Base | 1000 grams |
|---|---|
| Styrene Monomer Inhibitor Level 12 ppm | 700 grams |
| Cobalt octuate 12% | 1.7 grams |
| Tinavin 328 | 4.25 grams |
| Potassium octuate | 1.7 grams |
| Fumed silica added until desired cps is reached, 1800 cps | |

DCP = Aropol L-2496, available from Ashland Chemical, Columbus, Ohio.

We claim:
1. A composition of matter for use in making synthetic rock comprising:
an organic portion comprising one or more polymers selected from the group consisting of unsaturated polyesters, expoxies, phenolics and acrylics, wherein said polymer(s) comprise about 5-95% by weight of the organic portion;

an inorganic portion comprising particles formed by fusing a mixture 0.1 to 20 weight percent of a metal, 0.1 to 12 weight percent of oxide pigment, 0 to 90 weight percent of kaolin and a sufficient amount of first and second inorganic binders to provide fusing of said mixture when it is heated to a temperature of between about 1800° F. and 3000° F., wherein said first inorganic binder is feldspar and said second inorganic binder is silicon dioxide; and wherein said inorganic portion is dispersed within the organic portion and is about 5 to 90 percent by weight of the organic portion.

2. A composition according to claim 1 which further includes from about 0.5 to 3 weight percent of a plasticizer in said organic portion.

3. A composition according to claim 1 which further includes from about 0.5 to 5 weight percent of a U.V. inhibitor.

4. A composition according to claim 2 which further includes from about 0.5 to 5 weight percent of a U.V. inhibitor.

5. A composition according to claim 1 which further includes from about 0.5 to 5 weight percent of a fire retardant.

6. A composition according to claim 2 which further includes from about 0.5 to 5 weight percent of a first retardant.

7. A composition according to claim 4 which further includes from about 0.5 to 5 weight percent of a fire retardant.

8. A composition according to claim 2 wherein:
the polymer is vinyl ester;
the plasticizer is di-octyl-phthlate; and further including styrene monomer.

9. A composition according to claim 8 which further includes from about 0.5 to 5 weight percent of a U.V. inhibitor.

10. A composition according to claim 9 which further includes from about 0.5 to 5 weight percent of a fire retardant.

11. A composition according to claim 1 wherein the plasticizer is di-octyl-phthlate.

* * * * *